United States Patent [19]
Politz

[11] 3,823,964
[45] July 16, 1974

[54] ESCUTCHEON WITH POSITIONING MEANS

[75] Inventor: William E. Politz, Delphi, Ind.

[73] Assignee: Stephen A. Young, Monticello, Ind.

[22] Filed: Jan. 5, 1973

[21] Appl. No.: 321,453

[52] U.S. Cl. .............................................. 285/46
[51] Int. Cl. ............................................. F16l 5/00
[58] Field of Search ............ 285/46, 158, 162, 187, 285/403; 16/2; 248/256; 403/197

[56] References Cited
UNITED STATES PATENTS

| 922,471 | 5/1909 | Glauber | 285/46 |
| 1,080,520 | 12/1913 | Schuermann | 285/46 |
| 1,586,626 | 6/1926 | Johnson | 16/2 |
| 2,559,759 | 7/1951 | DeSwart | 16/2 |
| 3,559,730 | 2/1971 | Denjeon | 285/158 |
| 3,615,108 | 10/1971 | Toth | 285/46 |

Primary Examiner—Alfred R. Guest
Attorney, Agent, or Firm—Robb & Robb

[57] ABSTRACT

There is disclosed escutcheon construction for use in conjunction with concealed plumbing fittings, and having grippings means of resilient form removably mounted therein, said gripping means including a taper area, notches related thereto and retaining means whereby the escutcheon may be slidingly engaged with a sleeve and positioned therealong, the gripping action being such that the escutcheon is firmly and uniformly located.

6 Claims, 5 Drawing Figures

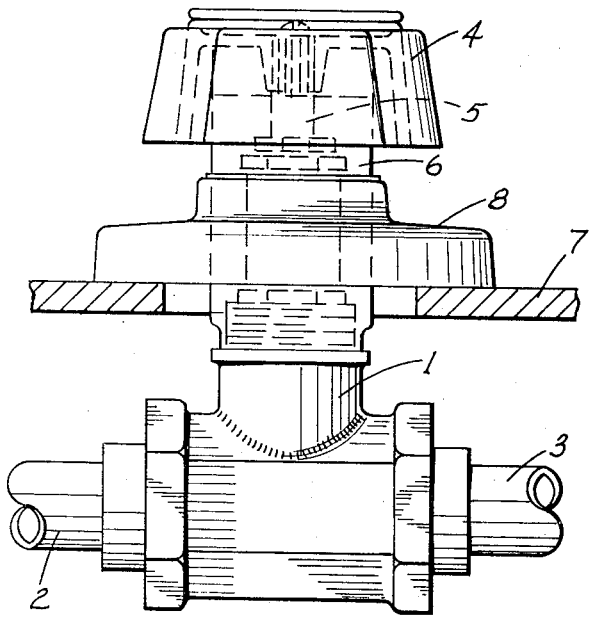
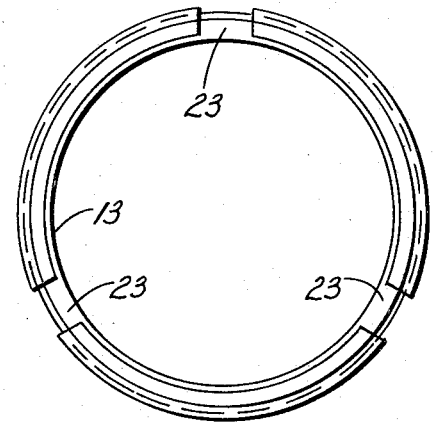
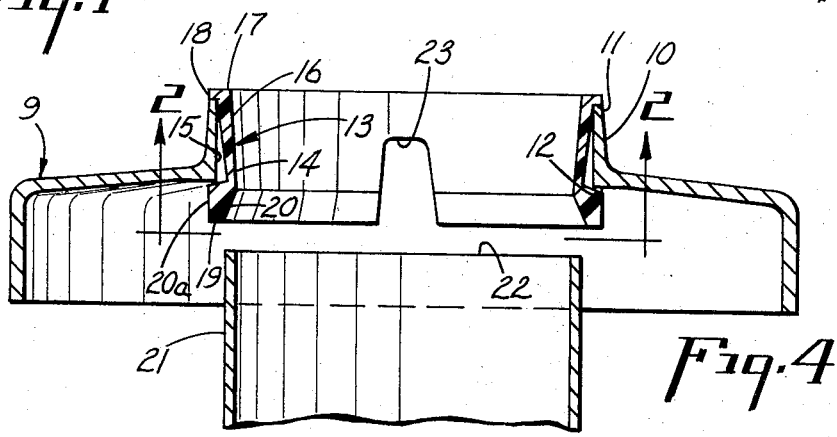
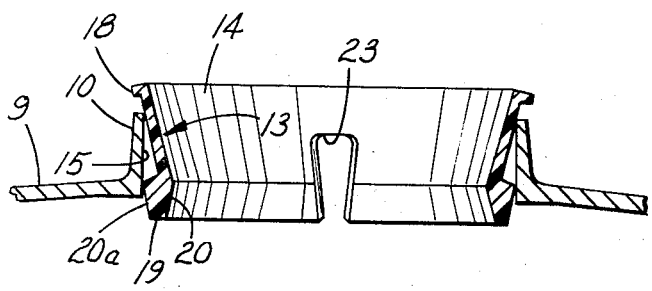
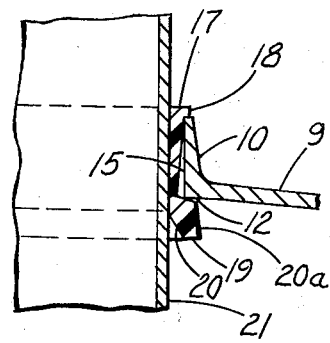

ESCUTCHEON WITH POSITIONING MEANS

OBJECTS OF THE INVENTION

It is a principal object of this invention to provide an improved form of escutcheon for use with concealed plumbing fittings which will be positioned accurately and uniformly along a sleeve engaged with the fitting and extending from the wall, the escutcheon being desirably adjustable along the sleeve and yet so firmly engaged therewith that without more substantial effort will be required to move the escutcheon.

A further object of the invention is to construct the escutcheon with an insert therein comprising gripping means which will be of simple construction, easily inserted into the escutcheon and yet when engaged with the sleeve, firmly and accurately position the same thereon.

Another object of the invention is to so arrange the respective elements of the escutcheon, including the escutcheon itself, and the gripping means provided therein, of resilient nature that it may be easily inserted in and removed from the escutcheon, yet positioning on a sleeve made very simple by the configuration of the gripping means, involving certain notches which relieve the pressure at initial positioning, and yet do not adversely affect the gripping action when ultimately in place.

Other and further objects of the invention will be understood from a consideration of the specification appended hereto and disclosed in the drawing, wherein:

FIG. 1 discloses the environment in which the escutcheon construction hereof is used.

FIG. 2 is a bottom view of an insert used in this escutcheon construction.

FIG. 3 is a fragmentary view in enlarged form and in section, illustrating the action of the insert when being placed in position in the escutcheon.

FIG. 4 is a greatly enlarged sectional view, showing the insert in position and in location for inserting the sleeve therein or positioning the escutcheon and its gripping means over the sleeve.

FIG. 5 is a fragmentary view in section, illustrating the position of the gripping means in its ultimate engagement with the sleeve and the escutcheon positioned thereon.

DESCRIPTION OF THE INVENTION

Referring now to FIG. 1, a concealed fitting of the nature generally disclosed in this figure is denoted at 1, including the usual supply 2 and outlet connections 3, controlled by a valve handle 4 which in turn operates a stem 5 to the interior of the valve 1 in the usual and conventional manner.

A suitable sleeve generally denoted 6 of tubular form is arranged to engage the valve 1 and extend outwardly from a wall designated 7.

This sleeve is designated to enclose the stem and provide a massive appearance, and it is therefore desirable to have the escutcheon generally designated 8, adjustable therealong so that variations in the depth to which the valve is mounted in or behind the wall 7 may be accommodated for and the escutcheon slidingly engaged with the sleeve so as to be adjustable therealong for this purpose.

Having the foregoing in mind, the escutcheon construction is now referred to in detail as disclosed in FIGS. 2 5 inclusive, the escutcheon comprising in this instance a skirt generally designated 9 which may be of any particular configuration but having at its center thereof a central tubular portion 10, integral with the skirt 9, and extending upwardly therefrom.

Shoulders 11 and 12 are formed at opposite ends of this tubular portion 10 for purposes which will hereinafter appear.

The resilient generally cylindrical collar 13 is comprised of a body section 14 to be received in a bore 15 of the cylindrical or tubular portion 10 previously referred to, and is provided with a taper area 16 which extends downwardly and inwardly from one end designated 17, this end 17 being in turn provided with retaining means 18 which is in the form of a peripheral enlargement.

The body section 14 of this collar 13, as shown in FIG. 4, is of suitable plastic material so that it is of resilient nature, and is further equipped at its other end 19 with an additional peripheral enlargement 20a, which peripheral enlargement 20a is shown as being engaged beneath the shoulder 12 formed in the central tubular portion 10.

A bevel 20 extending upwardly and inwardly in the body section 14 is of such a nature as to suitably receive the cylindrical part 21 therewithin as suggested in FIG. 4 wherein the upper end 22 of said part is positioned slightly below this bevel 20.

Suitable notches 23 are formed in the body section 14, and add to the resiliency thereof for the purposes of inserting the collar 13 as a whole into the cylindrical bore 15, as suggested in FIG. 3 wherein the peripheral enlargement 20a is shown partially through the bore 15, and the notch 23 reacting to the squeezing of the enlargement 20a is decreased in area as will be readily observed.

It should be explained that there are preferably three notches formed in the body section 14 of a shape and extent about as suggested in the respective views.

Since the enlargement 20a is being compressed as the body section 14 is under compression, when the collar 13 as a whole has been moved into the position shown in FIG. 5 and in FIG. 4 likewise, the enlargement 20a will move outwardly so as to grip beneath the shoulder 12 as primarily suggested in FIG. 4.

The collar 13 as a whole will be retained in position within the tubular portion 10 by means of the retaining means including the enlargements 18 and 20a, as will be readily apparent.

With the collar thus positioned, the cylindrical part 21 may be engaged by the escutcheon so comprised of the collar and skirt, including the tubular portion 10, as to cause the expansion of the enlargement section 20a when the cylindrical part 21 is entered into the bevel 20, the part 21 ultimately being positioned as suggested in FIG. 5, and the gripping action of this part maintaining the escutcheon as a whole in the position to which it is moved along said cylindrical part.

It will be further observed that the length of taper area 16 is such as to extend over a substantial area of the corresponding cylindrical part and by reason of the tension under which the part is placed when expanded to receive the cylindrical part 21, in conjunction with the configuration of the enlargement 20a, will maintain the gripping inter-engagement of the collar and thereby position the escutcheon of which it is a desirably incorporated part.

I claim:

1. The combination with an escutcheon comprising a skirt, a central tubular portion integral therewith, said portion having shoulders at opposite ends thereof, and a cylindrical bore therethrough, of a resilient generally cylindrical collar having a body section to be received in said bore, said section having an internal taper area therein adjacent one end of said section and notches extending from the other end, whereby to permit expansion of at least a portion of said section when a cylindrical part is inserted therein to grippingly engage such part to retain the escutcheon in position thereon.

2. The combination as claimed in claim 1, wherein retaining means are provided at the ends of the body section to engage the shoulders of the tubular portion, and position the body section with respect to the escutcheon.

3. The combination as claimed in claim 2, wherein the retaining means comprise peripheral enlargements of the ends of the section.

4. The combination as claimed in claim 2, wherein the retaining means comprise peripheral enlargements of the ends of the section, and the notches are proportioned to facilitate the insertion of the end of the section at which the same are formed, into the tubular portion.

5. The combination as claimed in claim 1, wherein the said internal taper area extends partially through the section and the other end is beveled in the other direction from the taper area, whereby such cylindrical part may be inserted into the said section through said other end.

6. The combination as claimed in claim 1, wherein the said internal taper area extends partially through the section and the other end is beveled in the other direction from the taper area whereby such cylindrical part may be inserted into the said section through said other end, the taper area thereafter conforming to the surface of such part and resiliently gripping the same throughout a substantial distance therealong.

* * * * *